United States Patent
Elkins et al.

(10) Patent No.: US 9,776,719 B2
(45) Date of Patent: Oct. 3, 2017

(54) AIR-LAUNCHABLE CONTAINER FOR DEPLOYING AIR VEHICLE

(71) Applicant: Raytheon Company, Waltham, MA (US)

(72) Inventors: Erick W. Elkins, Sahuarita, AZ (US); Matthew Glenn Murphy, Lafayette, CO (US); Scott D. Thomas, Tucson, AZ (US)

(73) Assignee: Raytheon Company, Waltham, MA (US)

( * ) Notice: Subject to any disclaimer, the term of this patent is extended or adjusted under 35 U.S.C. 154(b) by 415 days.

(21) Appl. No.: 14/018,493

(22) Filed: Sep. 5, 2013

(65) Prior Publication Data

US 2015/0266578 A1 Sep. 24, 2015

(51) Int. Cl.
*B64D 1/12* (2006.01)
*B64C 39/02* (2006.01)

(52) U.S. Cl.
CPC .............. *B64D 1/12* (2013.01); *B64C 39/024* (2013.01); *B64C 2201/021* (2013.01); *B64C 2201/082* (2013.01); *B64C 2201/201* (2013.01); *B64C 2201/206* (2013.01)

(58) Field of Classification Search
CPC .............. B64D 1/08; B64D 25/12; B64C 3/56
USPC .................................. 244/136, 137.1, 137.4
See application file for complete search history.

(56) References Cited

U.S. PATENT DOCUMENTS

| 2,382,442 | A | * | 8/1945 | Rich | ........................ | B64D 1/02 |
|---|---|---|---|---|---|---|
| | | | | | | 244/138 R |
| 3,568,201 | A | * | 3/1971 | Spoonamore et al. | ....... | 343/705 |
| 4,296,894 | A | * | 10/1981 | Schnabele | ............... | F42B 15/10 |
| | | | | | | 244/3.1 |
| 4,410,151 | A | * | 10/1983 | Hoppner | ............... | B64C 39/024 |
| | | | | | | 244/120 |

(Continued)

FOREIGN PATENT DOCUMENTS

| EP | 0562831 A1 | | 9/1993 | | |
|---|---|---|---|---|---|
| GB | EP 0562831 A1 | * | 9/1993 | ............... | B64D 7/08 |
| NO | WO 2012130790 A2 | * | 10/2012 | ............. | A63H 27/12 |

OTHER PUBLICATIONS

International Search Report and Written Opinion for corresponding patent application No. PCT/US2014/035653 dated Feb. 3, 2015.

*Primary Examiner* — Michael Wang
(74) *Attorney, Agent, or Firm* — Renner, Otto, Boisselle & Sklar, LLP

(57) ABSTRACT

A container is used to launch a small aircraft, such as an unmanned aerial vehicle (UAV), from a host aircraft. The container protects the UAV from stresses during the initial ejection from a launcher that is part of the host aircraft. The initial stresses may be due to turbulence in the vicinity of the host aircraft, high airspeed, and/or tumbling that may result from the ejection from the host aircraft moving at a high airspeed. The container may deploy a drag device, such as a drogue chute, to slow the container down and reorient the container, prior to deployment of the UAV from the container. During the time between ejection from the host aircraft and deployment from the container, the UAV may be powered up and acquire data, such as global positioning system (GPS) data, to allow the UAV a "hot start" enabling immediate mission commencement.

18 Claims, 2 Drawing Sheets

(56) References Cited

U.S. PATENT DOCUMENTS

| | | | |
|---|---|---|---|
| 4,899,583 A * | 2/1990 | Booker | G01W 1/08 |
| | | | 73/170.28 |
| 5,279,199 A * | 1/1994 | August | 89/1.51 |
| 5,456,427 A * | 10/1995 | Greenhalgh | B63B 22/003 |
| | | | 102/384 |
| 5,467,681 A * | 11/1995 | Liberman | F42B 10/56 |
| | | | 244/3.1 |
| 5,760,330 A * | 6/1998 | Himmert et al. | 102/489 |
| 6,056,237 A * | 5/2000 | Woodland | 244/3.15 |
| 6,082,675 A * | 7/2000 | Woodall, Jr. et al. | 244/137.4 |
| 6,260,797 B1 * | 7/2001 | Palmer | 244/49 |
| 6,494,140 B1 * | 12/2002 | Webster | 102/374 |
| 6,576,880 B2 * | 6/2003 | Martorana et al. | 244/3.1 |
| 6,808,144 B1 * | 10/2004 | Nicolai et al. | 244/139 |
| 7,252,270 B2 * | 8/2007 | Mitzmacher | 244/171.3 |
| 7,262,395 B2 * | 8/2007 | Bilyk et al. | 244/14 |
| 7,854,410 B2 * | 12/2010 | Fanucci et al. | 244/49 |
| 8,263,919 B2 * | 9/2012 | Murphy et al. | 244/3.1 |
| 8,939,056 B1 * | 1/2015 | Neal et al. | 89/1.51 |
| 2005/0093507 A1 | 5/2005 | Sliwa et al. | |
| 2005/0218260 A1 * | 10/2005 | Corder | B64C 3/56 |
| | | | 244/49 |
| 2005/0230555 A1 * | 10/2005 | Strong | 244/152 |
| 2007/0018033 A1 * | 1/2007 | Fanucci et al. | 244/3.27 |
| 2008/0078881 A1 * | 4/2008 | Parras | 244/137.1 |
| 2010/0012774 A1 | 1/2010 | Fanucci et al. | |

* cited by examiner

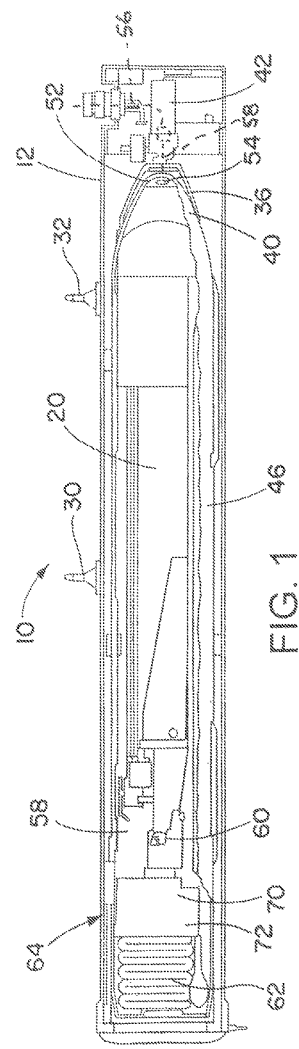
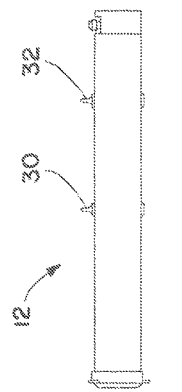
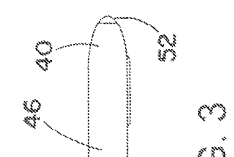
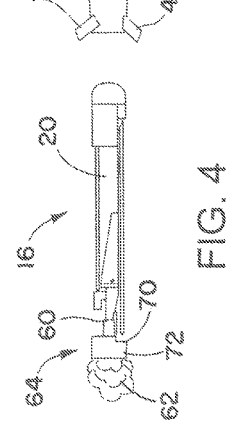

AIR-LAUNCHABLE CONTAINER FOR DEPLOYING AIR VEHICLE

GOVERNMENT RIGHTS

This invention was made with United States Government support under Contract Number FA8650-10-C-7004 with the United States Air Force. The United States Government has certain rights in this invention.

BACKGROUND OF THE INVENTION

Technical Field of the Invention

The invention is in the field of air-launchable objects, such as aircraft.

Description of the Related Art

Small unmanned aerial vehicles (UAVs) are intended to fly at relatively low altitudes and airspeeds. If launched from host aircraft at high altitudes and airspeeds, additional stresses are imposed on the airframes of the small UAVs when they are initially launched.

SUMMARY OF THE INVENTION

According to an aspect of the invention, an air-launched air vehicle is ejected from a host aircraft while the air vehicle is in a container, which protects the air vehicle from stresses due to the high airspeeds and/or turbulence in the vicinity of the host aircraft. The air vehicle later deploys from the container, after deceleration, loss of altitude, and orienting of the container. The use of the container initially after separation from the host aircraft removes the need for configuring the air vehicle to withstand the aerodynamic environment in the vicinity of the host aircraft.

According to another aspect of the invention, an air-launchable container for deploying an air vehicle includes a logic card or chip, for facilitating communication between the air vehicle and a host aircraft.

According to yet another aspect of the invention, an air-launched container that in turn launches an air vehicle includes: a sleeve that defines a volume therein that receives the air vehicle; a deployable drag device attached to the sleeve; and a release mechanism within the sleeve, for mechanically releasing the air vehicle from the sleeve.

According to a further aspect of the invention, a method of deploying an air vehicle from a host aircraft includes the steps of: ejecting from the host aircraft a container that contains the air vehicle; after the ejecting, decelerating the container and placing the container in a launch orientation for launching the air vehicle; and after the decelerating and the placing, launching the air vehicle from the container.

To the accomplishment of the foregoing and related ends, the invention comprises the features hereinafter fully described and particularly pointed out in the claims. The following description and the annexed drawings set forth in detail certain illustrative embodiments of the invention. These embodiments are indicative, however, of but a few of the various ways in which the principles of the invention may be employed. Other objects, advantages and novel features of the invention will become apparent from the following detailed description of the invention when considered in conjunction with the drawings.

BRIEF DESCRIPTION OF THE DRAWINGS

The annexed drawings, which are not necessarily to scale, show various features of the invention.

FIG. 1 is a side cutaway view of a launch system in accordance with an embodiment of the present invention.

FIG. 2 is a side view of a launcher of the launch system of FIG. 1.

FIG. 3 is a side view of a launchable container of the launch system of FIG. 1.

FIG. 4 is a side view of inserts of the launch system of FIG. 1, which are inserted into the container of FIG. 2.

DETAILED DESCRIPTION

Figure 5:
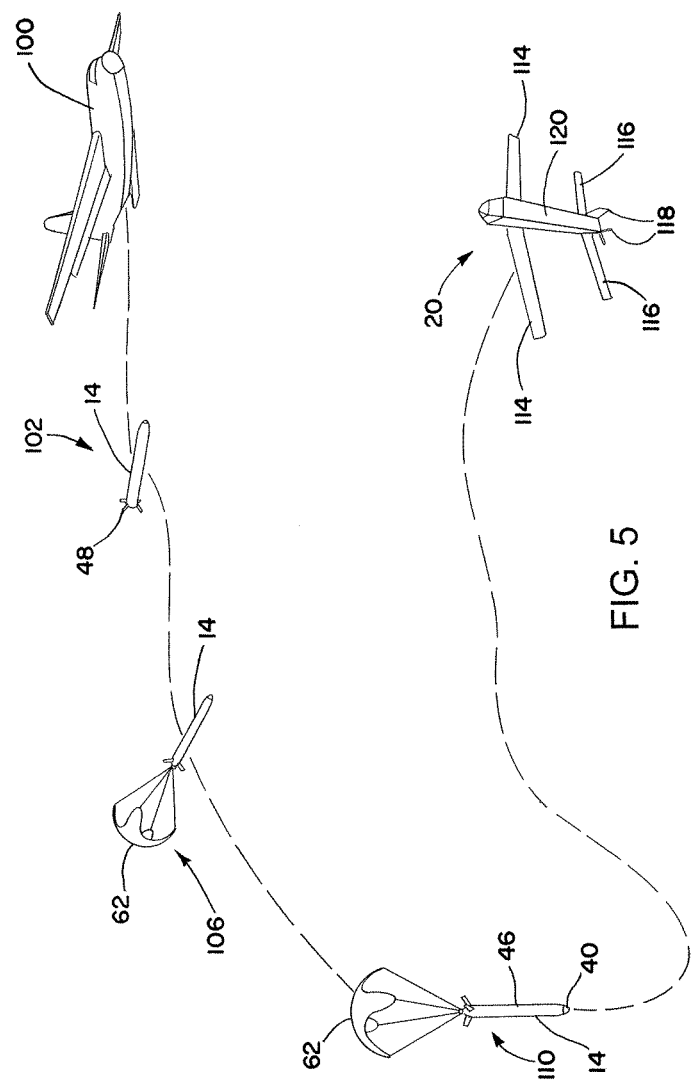
FIG. 5 is a schematic view illustrating operation of the launch system of FIG. 1.

A container is used to launch a small aircraft, such as an unmanned aerial vehicle (UAV), from a host aircraft. The container protects the UAV from stresses during the initial ejection from a launcher that is part of the host aircraft. The initial stresses may be due to turbulence in the vicinity of the host aircraft, high airspeed, and/or tumbling that may result from the ejection from the host aircraft moving at a high airspeed. The container may deploy a drag device, such as a drogue chute, to slow the container down and reorient the container, prior to deployment of the UAV from the container. During the time between ejection from the host aircraft and deployment from the container, the UAV may be powered up and acquire data, such as global positioning system (GPS) data, to allow the UAV a "hot start" that enables it to fly off on its mission as soon as it is released from the container. The container may be a smart container that enables provision of power and communication signals between the UAV and the launcher of the host aircraft. The container allows the UAV to have a less robust airframe, since it does not have to face the initial stresses of the initial ejection from the host aircraft. This allows for greater efficiency in mission performance.

FIGS. 1-4 show a launch system 10 and its components, used for launching a small aircraft from a host aircraft. The system 10 includes a launcher 12 (FIG. 2) that is part of the host aircraft, a container 14 (FIG. 3) that fits into the launcher 12 and is ejected from the host aircraft, and an aircraft insert 16 (FIG. 4) that fits into the container 14. The insert 16 includes an unmanned aerial vehicle (UAV) 20 that separates from the container 14 some time following the ejection of the container 14 from the host aircraft. Details of the major parts of the launch system 10 are now described in turn.

The launcher 12 may be a common launch tube such as those presently in use for launching munitions. For example, the launcher 12 may be a launcher that is capable of launching precision munitions such as the Griffin missile marketed by Raytheon Company. The launcher 12 is cylindrical, with a mostly hollow interior, for receiving both the container 14 and the aircraft insert 16 that is inside the container 14. The launcher 12 may have an inner diameter of 15.2 cm (6 inches), to give one (non-limiting) example. The launcher 12 includes a pair of mounts 30 and 32 for mounting to a host aircraft or other launch platform. An example of a suitable host aircraft is the C-130 Hercules transport aircraft.

The launcher 12 includes a mechanism for pushing out the container 14 (and its contents) from the launcher 12, to eject the container 14 from the host aircraft. The ejection mechanism includes a plunger 36 that pushes on a nose 40 of the container 14. The plunger 36 is activated by gas cartridge 42. Firing of the gas cartridge 42 causes combustible material within the gas cartridge 42 to burn and produce pressurized gases, in the same manner that a charge produces pressurized gases to inflate an automobile airbag. The pressurized gases push the plunger 36 to the left as shown in FIG. 1, pushing the container 14 and its contents out of the launcher 12. The plunger 36 may provide an acceleration of about 30 g's, to quickly expel the container 14 from the launcher 12. The gas cartridge 42 may be actuated (ignited) using a suitable signal received from the host aircraft, for example through a wired connection in the mounts 30 and 32 or elsewhere, or with a wireless signal.

The launcher 12 described in the previous paragraph is only one example of a suitable launcher. A wide variety of other suitable launchers may be used as alternatives.

The container 14 includes the nose 40, which fits into one end of a cylindrical sleeve 46 of the container 14. The nose 40 may engage a lip on the sleeve 46. As described in greater detail below, the nose 40 separates from the sleeve 46 in order to allow the UAV 20 to exit the container 14. This occurs after the container 14 has been ejected from the launcher 12, when the container 14 has decelerated and achieved a desired orientation. The nose 40 shown is one possible configuration for the end of the container 14. Alternatively the nose 40 may be omitted, with the container 14 having an open end in place of the omitted nose 40.

The container 14 may include fins 48 that deploy after ejection of the container 14 from the launcher 12. The fins 48 may aid in moving the container 14 safely away from the host aircraft after the ejection of the container 14. Specifically, the fins 48 deploy and create drag, which may help to keep the sleeve 14 from being caught up in the turbulence near the tail of the host aircraft. The fins 48 also help to orient the container into a predictable nose forward orientation, which aid the payload deployment sequence. As an alternative, the fins 48 may be omitted from the container 14.

The structural parts of the container 14, the nose 40, the sleeve 46, and fins 48, may all be made out of a suitable material, for example aluminum or steel. As an alternative, the sleeve 46 may be made of a biodegradable material, for example a dried particle-board-like material that may lose cohesion soon after getting wet. Use of a degradable material prevents an expended sleeve from being reused, such as by an enemy, possibly for nefarious purposes. As another alternative, the sleeve 46 may be made from a number of separate pieces that are jointed together in such a way, such as by severable wire, that the pieces become separated from one another after the sleeve 46 has fallen to ground.

The container 14 includes a logic card housing 52 at the tip of the nose 40. The logic card housing 52 houses a suitable logic board or card 54, for example in the form of one or more suitable integrated circuits and/or other suitable components, that enables communication between the UAV 20 and the host aircraft. Alternatively, some or all of these functions may be included as part of logic on the UAV 20, for example being embodied in an electronics board or other suitable device of the UAV 20. There may be a suitable wired connection, such as in a suitable wiring harness 56 (shown schematically in FIG. 1), that routes communications back and forth between the logic board 54 and the host aircraft. The wiring harness 56 may also provide power to the container 14 from the host aircraft. In addition the container 14 may include a wiring harness 58 (shown schematically in FIG. 1) that provides a wired connection between the container 14 and the UAV 20, which may provide connections for communication and perhaps power transmission. The wiring harness 58 may be configured to automatically disconnect when the container 14 is ejected from the launcher 12, and when the UAV 20 separates from the container 14. The UAV 20 is thus both electrically and mechanically coupled to the host aircraft prior to launch. Either or both of these wire harness may be replaced by a suitable wireless connection, for example for communication.

The plunger 36 engages the nose 40 away from the tip of the nose 40. This provides a suitably dispersed pushing force on the nose 40, and avoids any pressing against the logic card housing 52. Many different configurations for engagement of the plunger 36 and the container 14 are possible. For example, if the nose 40 is omitted, the plunger 36 may push on another part of the container 14.

The sleeve 46 defines and encloses (surrounds) a volume 58, for receiving the aircraft insert 16. The volume 58 may be generally cylindrical in shape.

The aircraft insert 16 that is inserted into sleeve 46 includes the UAV 20, an aircraft release mechanism 60 for releasing the UAV 20 from the sleeve 46, a drag device 62, and a release 64 for deploying the drag device 62. In the illustrated embodiment the drag device 62 is a chute, such as a drogue chute. Alternatively the drag device 62 may be another kind of drag-produce device, such a ballute. The chute 62 is deployed to decelerate the container 14 after its ejection from the host aircraft, and to put the container 14 in a predetermined orientation (a nose-down orientation) for release of the UAV 20 from the sleeve 46. The deployment of the drag device 62 may be delayed a predetermined time after the container 14 is ejected from the host aircraft, for example by about 5-6 seconds, in order to make sure that the container 14 is well away from the host aircraft. The circuit for executing the delay for the desired amount of time may be part of the logic 54. The amount of the delay may be another period of time, or may be a variable delay based on one or more factors.

The logic 54 may be used to allow the launch system 10 to be used with different types of UAVs or other aircraft to be launched. The logic 54 may be configured to be able to provide simple commands, such as commands to initiate operation of internal systems and/or to communicate information, that are appropriate for any of a variety of launchable aircraft. The logic 54 thus may be configured to "translate" communications from the launcher 12 to various types of aircraft to be launched.

The drag device release 64 may be a spring-loaded device that has a front portion 70 and a rear portion 72. The front portion 70 rests on a ledge 74 on an inside surface of the sleeve 46, and stays in place once the insert 16 is installed in the sleeve 46. A spring (not shown) between the portions 70 and 72 can be used to selectively propel the rear portion 72 rearward, expelling and deploying the drag device 62 in the process. The portions 70 and 72 may initially be held together under spring force, with a mechanical or other suitable mechanisms released to allow the spring to push the rear portion 72 rearward.

The aircraft release mechanism 60 is used for releasing the UAV 20 in order to allow the UAV 20 to separate from the rest of the container 14, in order for the UAV 20 to take flight. Prior to release, the mechanism 60 holds the UAV 20 in place within the volume 58. The mechanism 60 may have a pin or other suitable mechanical release, which may be actuated mechanically, electromechanically, or otherwise, to allow the UAV 20 to move within the volume 58, such as by sliding. Specifically, when the container 14 is in a nose-down configuration, release of the mechanism 60 allows the UAV 20 to move toward the nose of the container 14, under the action of gravity. The UAV 20 pops the nose 40 off of the sleeve 46, opening up the front of the container 14, allowing the UAV 20 to exit the container 14. As explained in greater detail below, the UAV 20 may then deploy its various control and lift surfaces (e.g., wings, elevons, and rudders), and begin flight.

The UAV 20 is only one example of an air vehicle that may be launched using the launch system 10. The launch system 10 may be used to launch a variety of air vehicles, a term which is used herein broadly to indicate air-launchable objects, for instance including sensors such as sonar buoys, weather-sampling devices, pollutant-detection devices, electronic intelligence-gathering devices, or image-capture devices such as cameras; jamming devices, or munitions such as bombs with structures that are possibly susceptible to damage from air loads.

FIG. 5 illustrates the process for deploying the UAV 20. The container 14 initially is ejected from a host aircraft 100, as shown at 102. When the container 14 is ejected from the host aircraft 100, the host aircraft 100 may be an altitude of 6,100 meters (20,000 feet) or greater, and may be traveling at a speed of 460 km/hour (250 knots) or greater, to give non-limiting example values. The fins 48 on the container 14 deploy, to slow down the container 14 and aid in providing separating the container 14 from the host aircraft 100.

After a delay the chute 62 is deployed, as shown at 106. The chute (or other drag device) 62 slows down the container 14 further, and orients of the container 14 with its nose pointed down. During this transition period certain operations of the UAV 20 may be started. The UAV's global positioning system (GPS) and/or other communications and/or navigation systems, may be initialized and able to acquire data. For example, the GPS may be able to acquire satellite data during this time. Control of operations during this time may be accomplished by the logic 54 (FIG. 1) of the container 14.

When the container 14 reaches its release point, shown at 110, the aircraft release mechanism 60 (FIG. 1) releases the UAV 20. As described earlier, this causes the UAV 20 to dislodge the nose 40 of the container 14, and emerge from the sleeve 46. The UAV 20 then deploys its wings 114, elevons 116, and rudders 118, all of which are coupled to its fuselage 120, moving from a stowed configuration to a deployed (flight) configuration. Deployment of the aerodynamic surfaces 114-118 may be accomplished by any of a variety of suitable mechanisms, such as spring loaded mechanisms, for example using the mechanisms disclosed in co-owned U.S. Pat. No. 7,338,010, the figures and detailed description of which are incorporated by reference. Since the UAV 20 is not deployed until it is traveling much slower than when the container 14 was ejected from the host aircraft 100, there is no need to make the UAV 20 able to withstand the large aerodynamic forces associated with such high speeds.

The flight of the UAV 20 may be a flight with a "hot start" that enables the UAV 20 to fly off on its mission almost as soon as it is released from the sleeve 46. That is, items like the GPS system and the autopilot system may be initialized with data already received, and ready for the UAV 20 to begin its mission. This removes the need for any sort of period of circling or non-mission initial flight while the UAV initializes its systems.

After separation from the UAV 20 the sleeve 46 may drift slowly to ground, still attached to the drag device 62. The sleeve 46 may either be recoverable or expendable.

The launch system 10 (FIG. 1) may be used to launch aircraft other than UAVs. It may, for example, be used to launch glide weapons or inflatable aircraft.

The use of the container 14, and the other components and features of the launch system 10, allows the UAV 20 to have a less robust airframe than if it was directly exposed to that high speeds and tumbling that occur during ejection from the host aircraft 100. The UAV does not have to face the initial stresses of the launch, and only deploys at lower speeds and in a low-stress orientation. In addition the UAV 20 is ready to begin its mission immediately when its surfaces 114-118 are deployed, eliminating the loss of battery power and/or altitude while circling after deployment. All of this allows for greater efficiency in UAV configuration and mission performance.

Although the invention has been shown and described with respect to a certain preferred embodiment or embodiments, it is obvious that equivalent alterations and modifications will occur to others skilled in the art upon the reading and understanding of this specification and the annexed drawings. In particular regard to the various functions performed by the above described elements (components, assemblies, devices, compositions, etc.), the terms (including a reference to a "means") used to describe such elements are intended to correspond, unless otherwise indicated, to any element which performs the specified function of the described element (i.e., that is functionally equivalent), even though not structurally equivalent to the disclosed structure which performs the function in the herein illustrated exemplary embodiment or embodiments of the invention. In addition, while a particular feature of the invention may have been described above with respect to only one or more of several illustrated embodiments, such feature may be combined with one or more other features of the other embodiments, as may be desired and advantageous for any given or particular application.

What is claimed is:

1. An air-launched container that in turn launches an air vehicle, the container comprising:
    a sleeve that defines a volume therein that receives the air vehicle;
    a deployable drag device attached to the sleeve;
    a release mechanism within the sleeve, for mechanically releasing the air vehicle from the sleeve; and
    a nose that is mechanically coupled to the sleeve, and that separates from the sleeve and the air vehicle as the air vehicle is launched from the sleeve; and
    wherein, when the release mechanism is released, the air vehicle is fully contained within the volume defined by the sleeve, and is free to slide within the volume relative to the sleeve and the nose, after release of the release mechanism and prior to separation of the nose from the sleeve and the air vehicle, wherein a forward sliding of the air vehicle causes the separation of the nose from the sleeve.

2. The container of claim 1, wherein the container includes logic for communication between the air vehicle and a host aircraft.

3. The container of claim 1, wherein the drag device includes a parachute.

4. The container of claim 1, wherein the sleeve includes deployable fins that deploy after ejection of the container from a launcher, and before release of the air vehicle from the sleeve.

5. The container of claim 1, wherein the sleeve is made of metal.

6. The container of claim 1, wherein the sleeve is made of a biodegradable material.

7. The container of claim 1, further comprising a drag device release within the sleeve that is operatively coupled to the drag device to deploy the drag device.

8. The container of claim 1, in combination with the air vehicle.

9. The combination of claim 8, wherein the air vehicle is an unmanned air vehicle that has a fuselage and deployable aerodynamic surfaces that are coupled to the fuselage.

10. The combination of claim 8, in combination with a launcher that deploys the container from a host aircraft that is mechanically coupled to the launcher.

11. The combination of claim 10,
wherein the launcher includes a plunger in contact with the nose of the container; and
wherein the plunger is used to push the container out of the launcher.

12. The combination of claim 11, wherein the launcher includes a gas cartridge that is operatively coupled to the plunger, to push the plunger to thereby push the nose of the container.

13. The combination of claim 10, wherein the launcher includes a pair of mounts for mounting to a host aircraft.

14. The combination of claim 8, wherein release of the release mechanism allows the air vehicle to slide within the container toward the nose.

15. The container of claim 1, wherein the volume is in an interior of the container, fully closed off from an exterior of the container by the sleeve and the nose.

16. The container of claim 1, wherein the release mechanism includes a mechanical release.

17. The container of claim 1, wherein the nose engages a lip of the sleeve.

18. The container of claim 1,
further comprising a first wiring harness and a second wiring harness that together provide a wired connection between the air vehicle and a host aircraft that the container is launched from;
wherein the first wiring harness runs from the host aircraft to the nose of the sleeve;
wherein the first wiring harness disconnects when the container is ejected from a launcher that is part of the host aircraft; and
wherein the second wiring harness disconnects when the air vehicle separates from the container.

* * * * *